2 Sheets—Sheet 1.
E. CRANE.
RAILROAD CAR WHEEL.
No. 26,022. Patented Nov. 8, 1859.
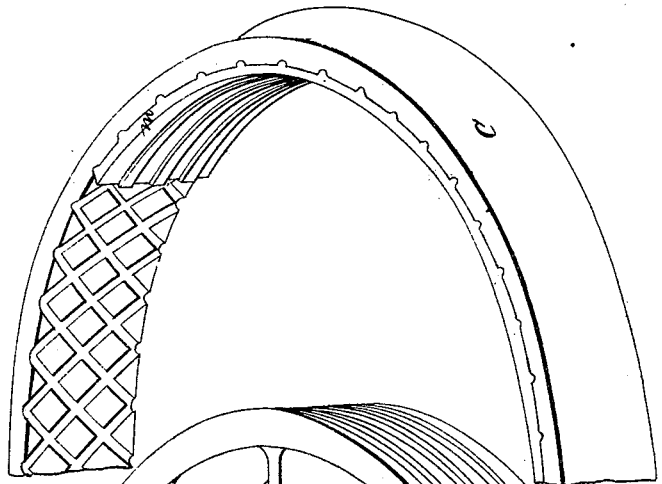
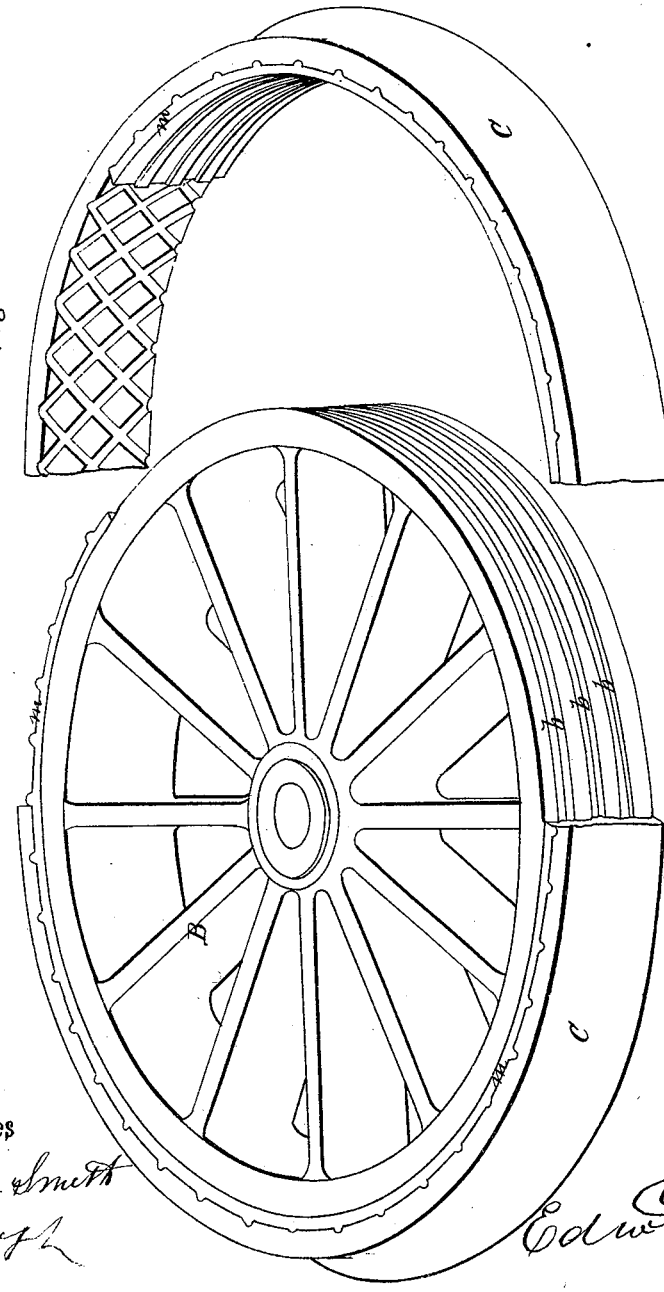
Witnesses
Chauncey Smith
A. Schoff
Inventor
Edw Crane 2 Sheets—Sheet 2.

E. CRANE.
RAILROAD CAR WHEEL.

No. 26,022. Patented Nov. 8, 1859.

Witnesses
Chauncey Smith
A. Schaupf

Inventor
Edw. Crane

UNITED STATES PATENT OFFICE.

EDWARD CRANE, OF DORCHESTER, MASSACHUSETTS.

RAILROAD-CAR WHEEL.

Specification of Letters Patent No. 26,022, dated November 8, 1859.

*To all whom it may concern:*

Be it known that I, EDWARD CRANE, of Dorchester, in the county of Norfolk and State of Massachusetts, have invented a new and useful Method of Inserting India-Rubber Between the Rim and Tire of Railroad-Car Wheels, of which the following is a full, clear, and exact description, reference being had to the accompanying drawings, making part of this specification, in which—

Figure 4:
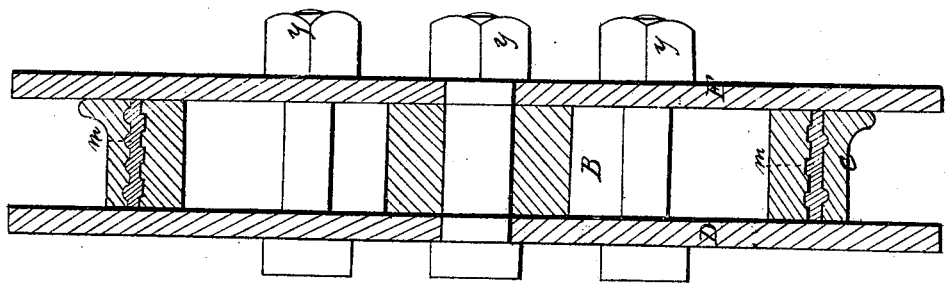
Figure 3:
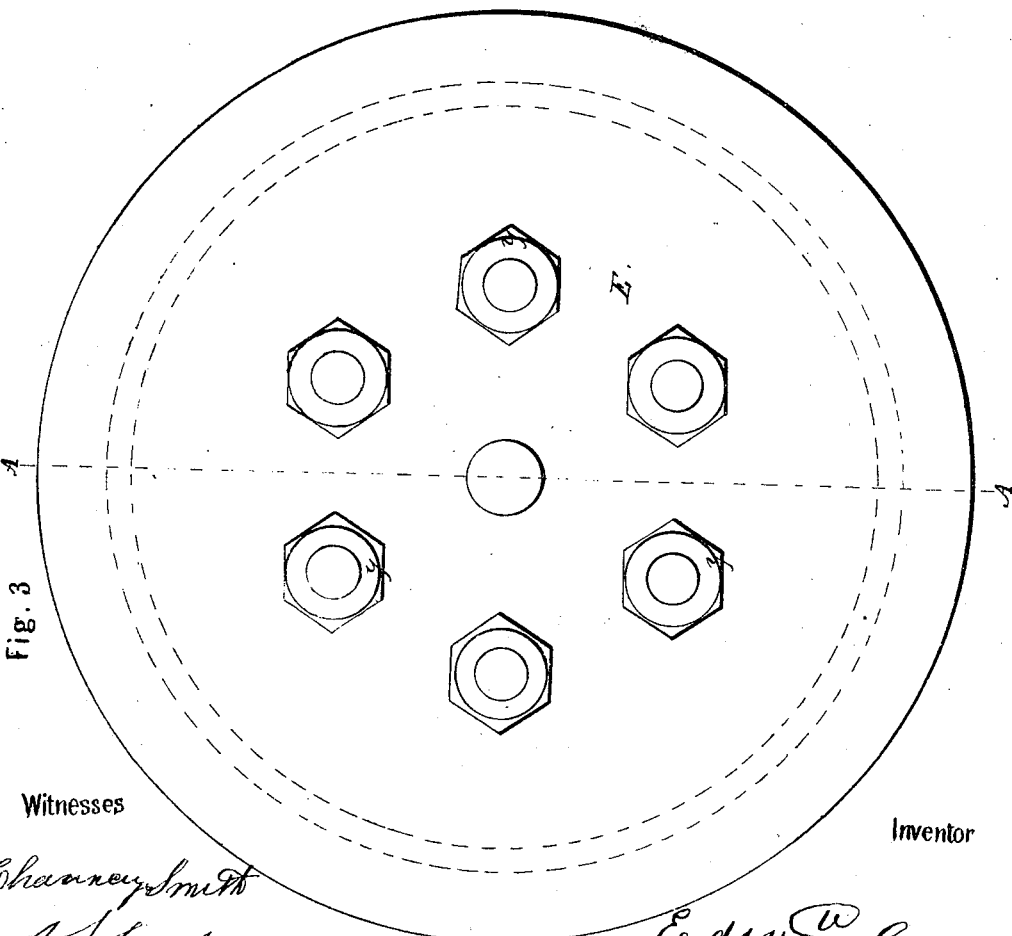

Figure 1 is a view of a car wheel made after my improved plan, and having a portion of the tire removed to show the grooves upon its interior surface and also upon the rim of the wheel. Fig. 2 is a portion of the tire removed from the wheel. Fig. 3 an elevation of the wheel confined between its vulcanizing plates. Fig. 4, a section through the line A, A, of Fig. 3.

Repeated efforts have been made to introduce india rubber between the rim and tire of railroad car wheels for the purpose of reducing as far as possible the wearing effect of the concussions to which the wheel is exposed upon the rolling stock and the rails, and also for the purpose of producing an economical trailing wheel that should be safer and less liable to be broken than the ordinary chilled tire wheel, but the wheels so constructed have not been found practically useful on account of various objections to which they were liable. Most of them have been too expensive, others have been made of several pieces united by bolts which were liable to be loosened, and required constant attention. In others the india rubber has not been sufficiently compressed to hold the parts in place.

To remedy all these objections is the object of my present invention which consists in inserting the prepared compound of india rubber between the rim and the tire of the wheel and subsequently vulcanizing it in place, the expansion of the india rubber during the process, being sufficient to unite the two portions of the wheel unmovably together.

To enable others skilled in the art to understand my invention I will proceed to describe the manner in which I have carried it out.

In the accompanying drawings B, is the body of a railroad car wheel cast without the tire and flange, and having upon the exterior surface of its rim grooves *b*, as seen in Fig. 1.

C, is the tire which is cast and chilled separate from the body of the wheel, the great danger of breakage arising from the unequal construction of the different parts of the wheel, being thereby entirely avoided.

The wheel and tire are put together as follows: The tire with or without its flange as the case may be, is laid upon a metallic plate D, and the body of the wheel is placed within it. India rubber compound *m* is then packed into the space between the two and a second plate E is laid upon this wheel, the wheel and plates being secured temporarily together by bolts and nuts *y* or otherwise. The wheel thus secured is now submitted to the necessary degree of heat to vulcanize the rubber, by which process it is expanded and consolidated and at the same time caused to adhere so closely to both the tire and the wheel as to secure the two parts immovably together. The plates D and E are then removed and the wheel is ready for use. In lieu of depending entirely upon the india rubber to hold the tire upon the wheel the former may be cast with a lip upon the side opposite to the flange against which the wheel may bear upon one side and upon the other side they may both be furnished with ears or projections so arranged that when put together the ears upon the wheel shall pass between those upon the tire, and by turning the wheel a short distance those on the wheel are brought beneath those on the tire and the two are held firmly together, the side strain being all taken by the flanges and ears, the india rubber compound which is inserted as before when vulcanized holding the parts immovably together.

In lieu of grooving the surfaces of the rim and the tire where they come in contact with the india rubber, projections may be made upon each of them, and in some circumstances the rough surface of the casting will take sufficient hold upon the india rubber to secure the two parts of the wheel together.

Thus far I have spoken only of wheels made of cast iron, but it is manifest that either the wheel or the tire, or both of them may be made of wrought iron or of other materials without altering the spirit of my invention.

I do not claim any of the details above described neither do I limit myself to their employment, but

What I claim as my invention and desire to secure by Letters Patent is—

A wheel having its rim and tire secured together by india rubber vulcanized in place as set forth.

EDWARD CRANE.

Attest:
JOHN S. HOLLINGSHEAD,
JOHN DOWLING.